April 15, 1941.　　　R. A. SALLEE　　　2,238,374
VALVE
Filed Sept. 27, 1939　　　2 Sheets-Sheet 1

INVENTOR.
Robert A. Sallee.
BY
Chas. E. Townsend.
ATTORNEY.

April 15, 1941.   R. A. SALLEE   2,238,374
VALVE
Filed Sept. 27, 1939   2 Sheets-Sheet 2

INVENTOR.
Robert A. Sallee.
BY
Chas. E. Townsend.
ATTORNEY

Patented Apr. 15, 1941

2,238,374

UNITED STATES PATENT OFFICE 2,238,374

VALVE

Robert A. Sallee, Point Richmond, Calif.

Application September 27, 1939, Serial No. 296,779

6 Claims. (Cl. 277—33)

This invention relates to valves, and especially to mechanism for moving the valve to and away from its seat, and other mechanism for imparting rotary movement to the valve when on its seat, so as to permit grinding of the valve with relation to its seat.

In oil refineries and other industries where liquids such as crude and partially refined oils are transferred from one still or cracking apparatus to another under high pressure, and often under high temperatures, different types of valves have been employed, such as globe valves, gate valves, etc., as considerable trouble is encountered in maintaining tight valves, due to pitting of the valves and seats and also due to accumulation of scale and other foreign material. When leakage commences in valves of this character it is usually necessary to by-pass or close the flow through that particular line, and then to remove the leaking valve to re-face, re-grind, or otherwise repair it. This involves interruption where continuous operation is desired, and obviously increases cost of maintenance and repair.

The object of the present invention is generally to improve and simplify the construction and operation of valves of the character described; to provide a valve of the globe or mushroom type, which may be ground with relation to its seat without uncoupling or removal of the valve from the pipe line; to provide a globe valve which when open will assume a position at right angles to its seat, to permit a free, substantially unobstructed flow of liquid; and further, to provide a duplex or twofold valve with a common means for rotating both valves in unison with relation to their respective seats when grinding the same, and a common means for opening and closing the valves in unison.

The invention is shown by way of illustration in the accompanying drawings, in which Fig. 1 is a central vertical longitudinal section of the valve;

Figure 1:
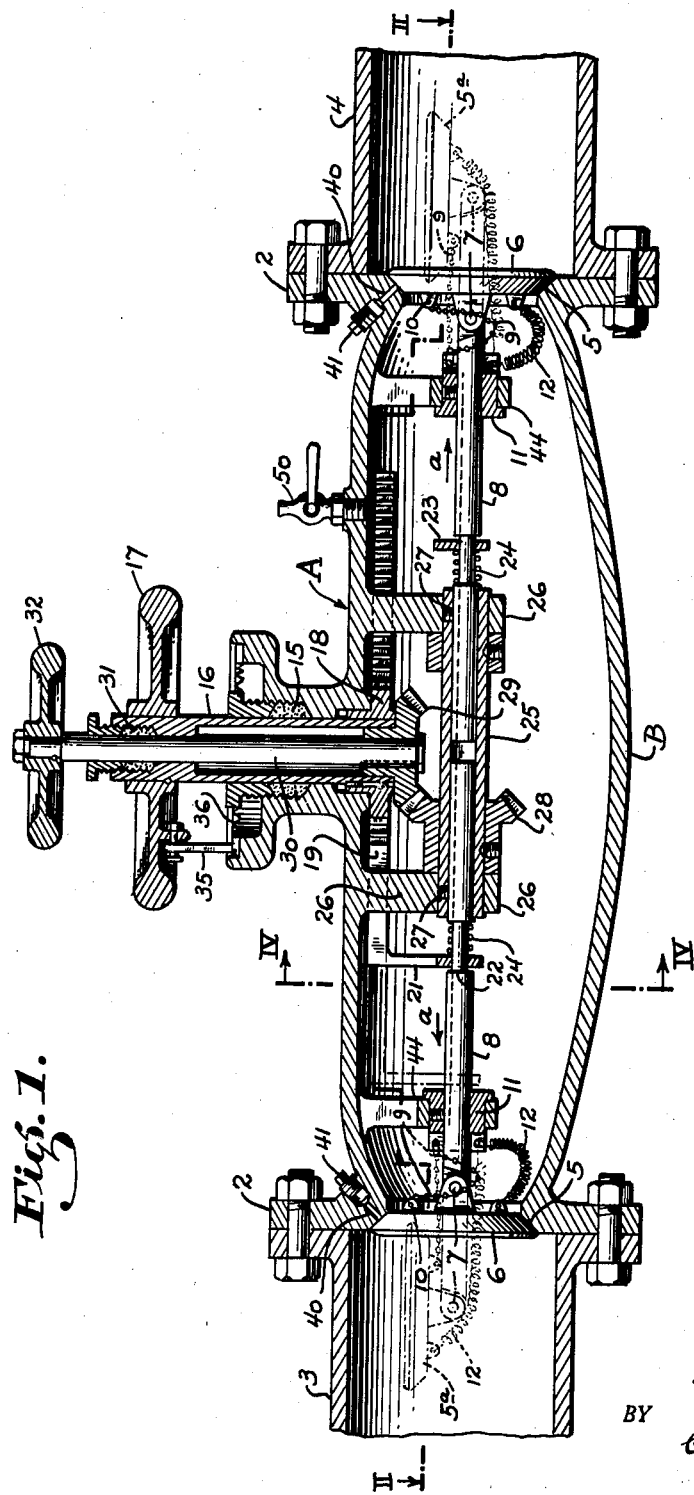

Referring to the drawings in detail, and particularly to Fig. 1, A indicates a valve casing or housing, the opposite ends of which are flanged as at 2 to permit it to be coupled or otherwise secured in a pipe line, portions of which are indicated at 3 and 4. A threaded connection may obviously be employed if so desired. At opposite ends of the valve casing are formed seats 5—5, and engaging said seats are valves 6—6 of the globe or mushroom type. Both valves are mounted to operate in the same manner; hence it is believed that the description of one will suffice. The valve 6 at the left hand side of the drawings is pivotally mounted as at 7 on the end of a shaft 8. A chain 9 is attached to the valve as at 10 and to a bearing sleeve 11 at the opposite end. A spring 12 is also attached to the valve at a point diametrically opposite the chain 9, and the other end of the spring is attached to the bearing sleeve. Means are provided for imparting longitudinal movement to the shaft 8; for instance, if the shaft is moved in the direction of arrow $a$ the valve will first move bodily away from the seat 5, then as the chain 9 becomes taut and the shaft continues to move, the valve will pivot about the point 7 and will finally assume the horizontal dotted-line position indicated at 5a. The valve is then fully open, and as the opposite valve is operated in the same manner, a free flow past the valves and through the valve casing is insured.

Figure 2:
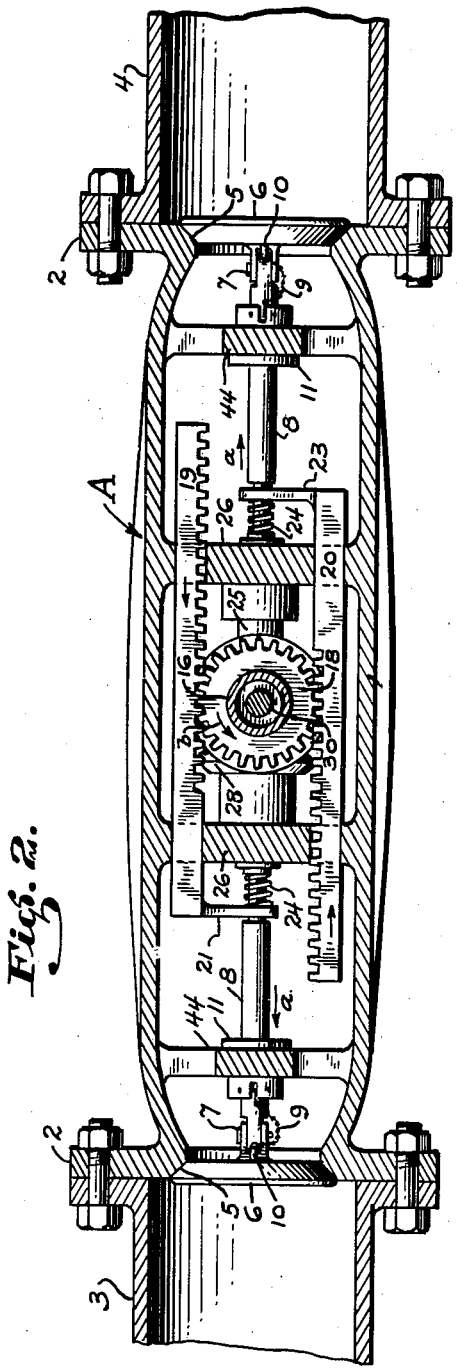
Fig. 2 is a horizontal section taken on line II—II of Fig. 1.
Figure 4:
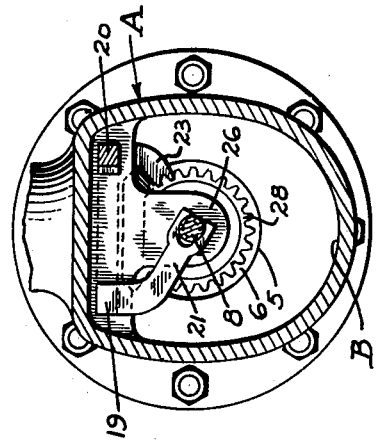
Fig. 4 is a cross section taken on line IV—IV of Fig. 1.
Figure 3:
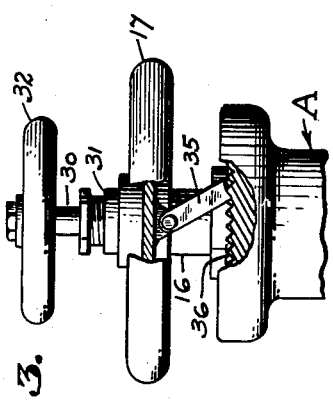
Fig. 3 is a detail view showing the hand-wheel 17 whereby the main valve stem is rotated, said view also showing the ratchet and pawl mechanism for retaining the valve on its seat.

The manner in which longitudinal movement is imparted to the shafts 8—8 is as follows: At the center of the valve housing, and on top thereof, is a stuffing box 15. Extending through it is a tubular stem 16 which is rotated by means of a handle 17 secured thereto. On the lower end of the tubular stem is secured a spur gear 18 (see Figs. 1 and 2). This gear engages with a pair of rack bars 19 and 20 slidably mounted in bearing lugs 26 formed within the valve casing. The rack bar 19 is connected with the left hand shaft 8 by means of a fork 21 which engages a shoulder 22 formed on the shaft by recessing or reducing the diameter of the shaft as shown. The rack bar 20 similarly has a fork 23 which engages a similar shoulder formed on the shaft 8 whereby the right hand valve is operated. By rotating the hollow valve stem 16 through means of the handle 17, gear 18 is rotated, and if it is rotated in the direction of arrow $b$ (see Fig. 2) the rack bar 19 will move in the direction of the indicating arrow and the rack bar 20 in the opposite direction. Thus the shafts 8—8 are moved outwardly, and in opposite directions, thereby opening the valves 6—6 in unison; conversely, by reversing the rotation of the tubular stem, the valves will be closed.

In as much as the present invention includes means for rotating the valves 6—6 with relation to their seats, so as to permit grinding of the valves with relation to the seats, it is essential that means be provided for yieldingly securing the valves with relation to the seats during the grinding operation. This is accomplished by introducing helical compression springs between the forks 21 and 23 and collars formed by the reduced portions of the shafts 8—8. When the forks 21 and 23 move to pull shafts 8—8 towards each other, or in other words in the direction to close the valves, the forks will engage the springs, and the moment the valves reach their seats the forks may continue a slight distance, thereby placing the springs under compression, and any yielding pressure may thus be maintained on the valves when they are closed, this being important during the grinding operation, as will hereafter appear.

Also means must be provided for locking or securing the rack bars when pressure is applied to the springs as hereinbefore described. This is accomplished by forming an annular rack bar 36. This rack bar is formed on the upper face of the stuffing box 15, and it is engaged by one or more pawls 35 pivoted to the hand-wheel 17. As the hand-wheel 17 is rotated to close the valves 6, the pawls 35 will ride free over the rack bar teeth 36, but the moment the valves reach closed position, a further rotation of the hand-wheel will place the springs under compression and they will be held under compression by the pawls 35, as this will lock the hand-wheel 17 against reverse rotation, and will retain it there until the pawls are released.

The invention contains another feature, to wit, means for imparting rotational movement to the shafts 8—8, so that the valves 6 may be rotated with relation to their seats.

The means for imparting rotational movement to the shafts 8—8 is best shown in Fig. 1. It comprises a sleeve 25 which is journaled in the bearings 26—26. The sleeve is splined to the shafts 8—8 as indicated at 27, and thus transmits movement to the shafts with relation to the sleeve; and it also permits rotational movement to be imparted by the sleeve to the shafts. Secured to or formed integral with the sleeve is a bevel gear 28. This meshes with a bevel gear 29 secured on the shaft 30 which extends through the hollow valve stem 16. A stuffing box 31 is provided at the upper end of the hollow stem to prevent leakage. Shaft 30 is provided with a handle 32. By grasping this handle and rotating it back and forth, rotary or oscillating movement will be transmitted to the shaft 30 and through the gears 29 and 28 to the sleeve 25, and as this is splined to the shafts 8—8, these shafts will rotate or oscillate in unison therewith.

The valves 6, as previously stated, are pivoted as at 7 to the outer ends of the respective shafts 8—8, and rotational or oscillating movement is accordingly transmitted to the valves when the shafts are oscillated. Mechanism has accordingly been provided for imparting rotational or oscillating movement to the valves when in engagement with their seats. If a small piece of scale or other foreign matter has lodged between the valve and its seat, it is often removed or dislodged by merely rotating the handle 32 a few times, thus permitting the valve to seat snugly when the obstruction is ground out or removed. Again, the valves or their seats may be pitted, and may require grinding to re-seat them. In that case, ducts 40 are provided, through which a grinding compound of any suitable character may be introduced. These ducts are normally closed by plugs or similar means 41, which are removed when a grinding compound is to be introduced, and, conversely, replaced when the grinding operation is completed. The springs 24 yieldingly hold the valves on their seats; this is obviously important, as it permits the grinding compound to work around between the valves and their seats when they are being oscillated or rotated. Also it permits scale and other foreign matter to be readily dislodged.

In as much as the shafts 8 and valves 6 are rotated during a grinding operation, the chains 7 and springs 12 would have a tendency to become wound about the respective shafts, and would limit rotational movement of the valves and shafts. To avoid this, the bearing sleeves 11 are rotatably mounted in bearing lugs 44 formed within the valve casing. These bearing sleeves are furthermore splined to the respective shafts 8, so as to rotate in unison with the same, thereby avoiding any tendency for the chains or springs to wind about the shafts.

By providing a duplex or two fold valve as here shown, pressure flow may be maintained through the valve casing in either direction. By depressing the bottom, or forming a concave bottom portion B, of the valve casing, the flow passage through the valve casing is increased in area to maintain a substantially free flow. If this were not done, the sleeve 25, the forks 21—23, and the gears and racks employed in conjunction therewith might form a sufficient obstruction to materially reduce fluid or liquid flow, but by enlarging the valve casing at a point below this mechanism, such hindrance to flow is obviated.

When the valves are closed, if it is desired to test them for leakage, it is only necessary to open a petcock such as shown at 50. This is preferably located on the upper surface of the valve casing, so that if there is leakage, a flow will be indicated by discharge of liquid through it. On the other hand, if there is no leakage, there will be no flow.

Suffice it to say that a duplex valve is provided; a common means will open and close both valves in unison; other means impart rotation to the valves to permit grinding of the same; and all this is accomplished without removing or uncoupling the valve with relation to the line. Furthermore, minor re-grinding operations can be accomplished in such a short time that continuous flow through the lines is hardly interfered with.

The swinging of the valves with relation to the shaft 8 to the horizontal position shown in dotted lines is also of material importance, as in this position the valves occupy the least space and therefore form the least obstruction to free flow through the connected pipe lines and the valve casing proper.

While certain features of my invention have been more or less specifically described and illustrated I nevertheless wish it understood that changes may be resorted to within the scope of the appended claims.

Having thus described my invention, what I claim and desire to secure by Letters Patent is—

1. In a valve of the character described, a valve casing having a valve seat, a valve engageable with the seat, a valve stem upon which the valve is pivotally mounted, said valve assuming a position parallel to its seat and at right angles to the stem when in engagement with the seat, means for imparting longitudinal movement to the stem to move the valve away from its seat, other means for automatically moving the valve about its pivot to assume a position parallel to the valve stem and at right angles to the seat during movement of the valve away from its seat and means for imparting rotary movement to the valve when in engagement with the seat.

2. In a valve of the character described, a valve casing having a valve seat, a valve engageable with the seat, a valve stem upon which the valve is pivotally mounted, said valve assuming a position parallel to its seat and at right angles to the stem when in engagement with the seat, means for imparting longitudinal movement to the stem to move the valve away from its seat, and a chain attached at one end to a stationary support and at the opposite end to the valve, said chain moving the valve about its pivot to assume a position parallel to the valve stem and at right angles to the seat during movement of the valve away from its seat.

3. In a valve of the character described, a valve casing having a valve seat, a valve engageable with the seat, a valve stem upon which the valve is pivotally mounted, said valve assuming a position parallel to its seat and at right angles to the stem when in engagement with the seat, means for imparting longitudinal movement to the stem to move the valve away from its seat, other means for automatically moving the valve about its pivot to assume a position parallel to the valve stem and at right angles to the seat during movement of the valve away from its seat, and other means for swinging the valve about its pivot to assume a position parallel to its seat and at right angles to the stem during movement of the valve.

4. In a valve of the character described, a valve casing having a valve seat, a valve engageable with the seat, a valve stem upon which the valve is pivotally mounted, said valve assuming a position parallel to its seat and at right angles to the stem when in engagement with the seat, means for imparting longitudinal movement to the stem to move the valve away from its seat, a chain attached at one end to a stationary support and at the opposite end to the valve, said chain moving the valve about its pivot to assume a position parallel to the valve stem and at right angles to the seat during movement of the valve away from its seat, and a spring attached at one end to a stationary support and at the opposite end to the valve, said spring exerting a pull to swing the valve to assume a position parallel to its seat and at right angles to the stem during closing movement of the valve.

5. In a valve of the character described, a valve casing having a valve seat, a valve engageable with the seat, a stem on the valve, a second stem disposed at right angles to the first stem, gears connecting the stems, means for rotating the second stem to impart rotational movement to the valve with relation to its seat, a third stem disposed at right angles to the first stem, a gear on said third stem, a rack bar with which said gear intermeshes to impart longitudinal movement to the rack bar, and means on the rack bar for transmitting longitudinal movement to the first stem and valve.

6. In a valve of the character described a valve casing having opposed valve seats formed therein, a valve engageable with each seat, means for imparting rotational movement in unison to both valves with relation to their respective seats, other means for moving the valves to and away from their seats in unison, and means for automatically swinging both valves to assume a position at right angles to their seats when they are moved away from their respective seats.

ROBERT A. SALLEE.